United States Patent
Murakami et al.

(10) Patent No.: US 10,571,712 B2
(45) Date of Patent: Feb. 25, 2020

(54) LENS BARREL THAT PREVENTS OSCILLATION PHENOMENON OF LENS BARREL, AND IMAGE PICKUP APPARATUS

(71) Applicant: CANON KABUSHIKI KAISHA, Tokyo (JP)

(72) Inventors: Taro Murakami, Musashino (JP); Kiyoshi Nitto, Saitama (JP); Keisuke Adachi, Tokyo (JP); Shuichi Terada, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 15/006,828

(22) Filed: Jan. 26, 2016

(65) Prior Publication Data

US 2016/0216530 A1   Jul. 28, 2016

(30) Foreign Application Priority Data

Jan. 28, 2015 (JP) ................................. 2015-014174
Jan. 18, 2016 (JP) ................................. 2016-007133

(51) Int. Cl.
G02B 27/64 (2006.01)

(52) U.S. Cl.
CPC ................................. *G02B 27/646* (2013.01)

(58) Field of Classification Search
None
See application file for complete search history.

(56) References Cited

U.S. PATENT DOCUMENTS

2010/0002309 A1* 1/2010 Nagae ..................... G02B 7/102
  359/699
2015/0192756 A1* 7/2015 Uno ........................ G02B 7/10
  359/696

FOREIGN PATENT DOCUMENTS

| CN | 1248710 A | 3/2000 |
| CN | 1309322 A | 8/2001 |
| CN | 1685266 A | 10/2005 |
| CN | 101025464 A | 8/2007 |
| CN | 101493564 A | 7/2009 |
| CN | 103238096 A | 8/2013 |
| JP | 2004-198742 1 | 7/2004 |
| JP | 2010-190986 A | 9/2010 |

(Continued)

OTHER PUBLICATIONS

Mar. 29, 2018 Chinese Office Action, that issued in Chinese Patent Application No. 201610059439.0.

(Continued)

*Primary Examiner* — Darryl J Collins
*Assistant Examiner* — Journey F Sumlar
(74) *Attorney, Agent, or Firm* — Cowan, Liebowitz & Latman, P.C.

(57) ABSTRACT

A lens barrel that prevents an oscillation phenomenon caused by vibrations occurring when a lens of an image blur correction mechanism shifts. A first cylinder is engaged in the cam cylinder and caused to move in a direction of an optical axis by rotation of a cam cylinder. A second cylinder supports a lens holding member, which moves in a direction different from a direction of an optical axis so as to correct for an image blur, and is engaged in the cam cylinder and caused to move in the direction of the optical axis by rotation of the cam cylinder. The second cylinder has a first vibration isolation pin that is engaged with the first cylinder movably in the direction of the optical axis.

8 Claims, 19 Drawing Sheets

(56) References Cited

FOREIGN PATENT DOCUMENTS

| JP | 2011-008046 A | 1/2011 |
|----|---------------|--------|
| JP | 2012-063755 A | 3/2012 |
| WO | 2013/027315 A1 | 2/2013 |

OTHER PUBLICATIONS

The above foreign patent document was cited in the Oct. 21, 2019 Japanese Office Action, a copy of which is enclosed without an English Translation, that issued in Japanese Patent Application No. 2016007133.

* cited by examiner

LENS BARREL THAT PREVENTS OSCILLATION PHENOMENON OF LENS BARREL, AND IMAGE PICKUP APPARATUS

BACKGROUND OF THE INVENTION

1. Field of the Invention

The present invention relates to a lens barrel having an image blur correction mechanism, and an image pickup apparatus such as a film camera, a digital camera, or a digital video camera, which is equipped with the lens barrel.

2. Description of the Related Art

Some lens barrels mounted on an image pickup apparatus such as a digital camera are equipped with an image blur correction mechanism that corrects for a blur of a subject image formed on a light-incident surface by shifting a part of taking lenses so as to prevent image degradation caused by camera shake or the like.

There has been proposed a lens barrel which has, as mechanisms that linearly guide taking lenses in a direction of an optical axis while inhibiting rotation of the lenses, two straight advance mechanisms consisting of one comprised of a first straight advance groove and a first straight advance key and one comprised of a second straight advance groove and a second straight advance key (Japanese Laid-Open Patent Publication (Kokai) No. 2012-63755). According to this proposal, the two straight advance mechanisms have an area where a straight advance key and a straight advance groove engage and an area where they do not engage. In an area where a cam groove of a cam cylinder and one straight advance groove cross each other, a straight advance key is engaged with the other straight advance groove.

Also, there has been proposed a lens barrel which has a plurality of partial straight advance guide members which, when linearly guiding a straight moving member holding an optical element in a direction of an optical axis through rotation of a rotary ring, linearly guides the straight moving member in the direction of the optical axis in a plurality of different split moving ranges (Japanese Laid-Open Patent Publication (Kokai) No. 2011-8046).

According to both Japanese Laid-Open Patent Publication (Kokai) No. 2012-63755 and Japanese Laid-Open Patent Publication (Kokai) No. 2011-8046, a plurality of straight advance mechanisms are engaged or disengaged depending on areas. For this reason, when only part of the plurality of straight advance mechanisms is engaged, an oscillation phenomenon of the lens barrel may occur because vibrations occurring when a lens of the image blur correction mechanism shifts are amplified, and particularly when the lens is heavy, the oscillation phenomenon is likely to occur.

SUMMARY OF THE INVENTION

The present invention provides a technique to prevent an oscillation phenomenon of a lens barrel caused by vibration occurring when a lens of an image blur correction mechanism shifts.

Accordingly, the present invention provides a lens barrel comprising a cam cylinder, a first cylinder configured to be engaged in the cam cylinder and caused to move in a direction of an optical axis by rotation of the cam cylinder, and a second cylinder configured to support a lens holding member, which moves in a direction different from the direction of the optical axis so as to correct for an image blur, and be engaged in the cam cylinder and caused to move in the direction of the optical axis by rotation of the cam cylinder, wherein the second cylinder comprises a first vibration isolation pin that is engaged with the first cylinder movably in the direction of the optical axis.

According to the present invention, an oscillation phenomenon of the lens barrel caused by vibration occurring when a lens of an image blur correction mechanism shifts is prevented.

Further features of the present invention will become apparent from the following description of exemplary embodiments (with reference to the attached drawings).

DESCRIPTION OF THE EMBODIMENTS

Hereafter, an embodiment of the present invention will be described with reference to the drawings.

Figure 1:
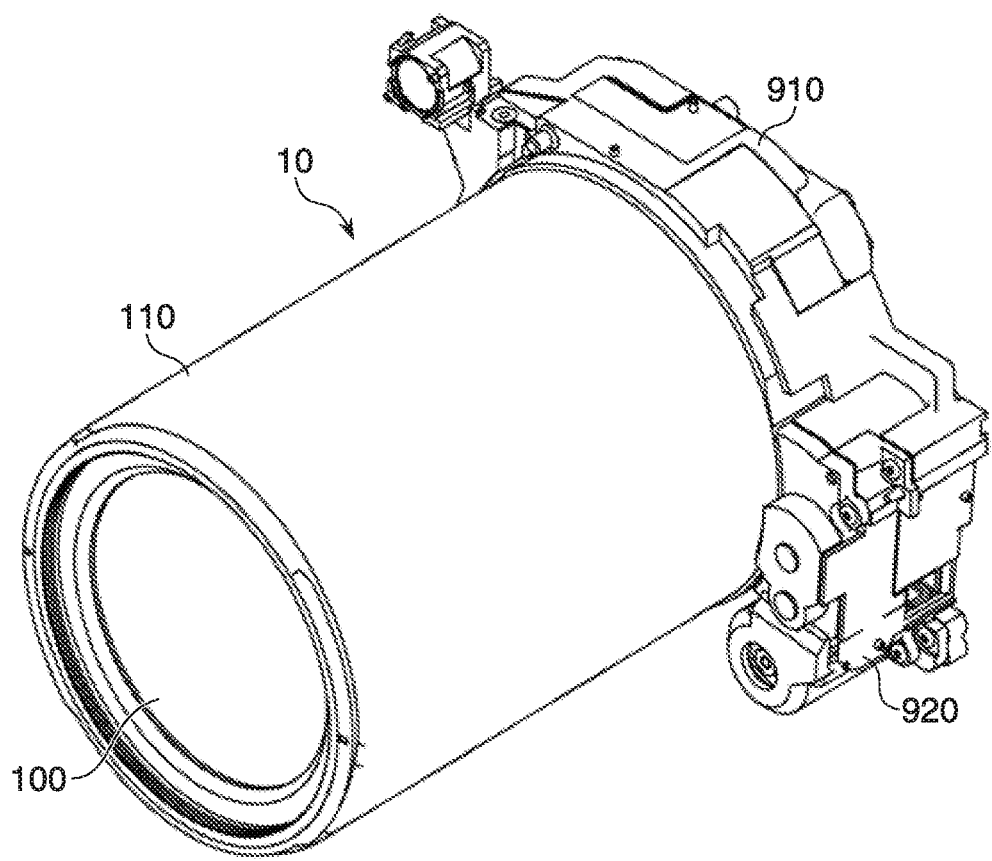
FIG. 1 is a perspective view showing a lens barrel according to an embodiment of the present invention.
Figure 2:
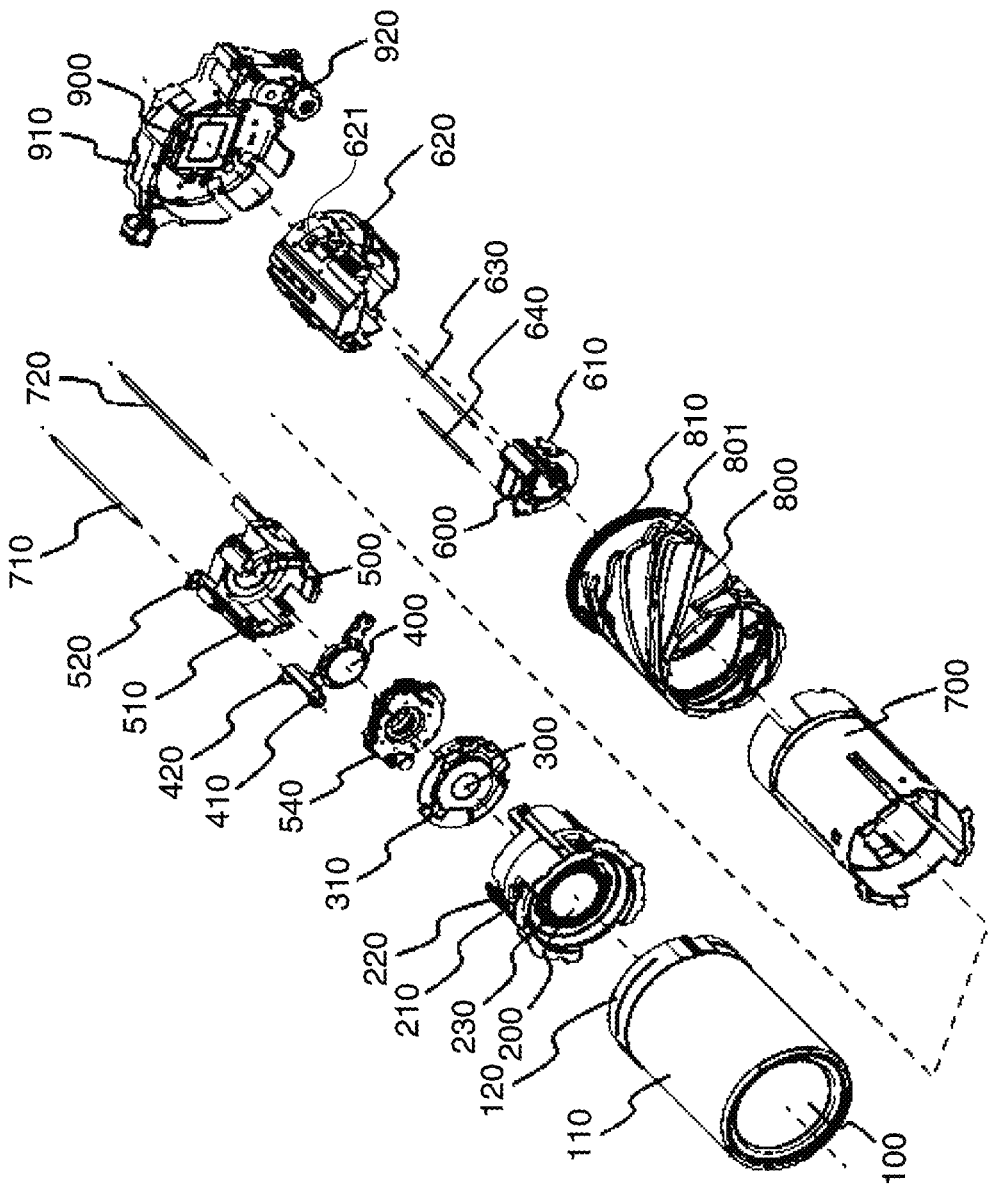
FIG. 2 is an exploded perspective view showing the lens barrel in FIG. 1.
Figure 3:
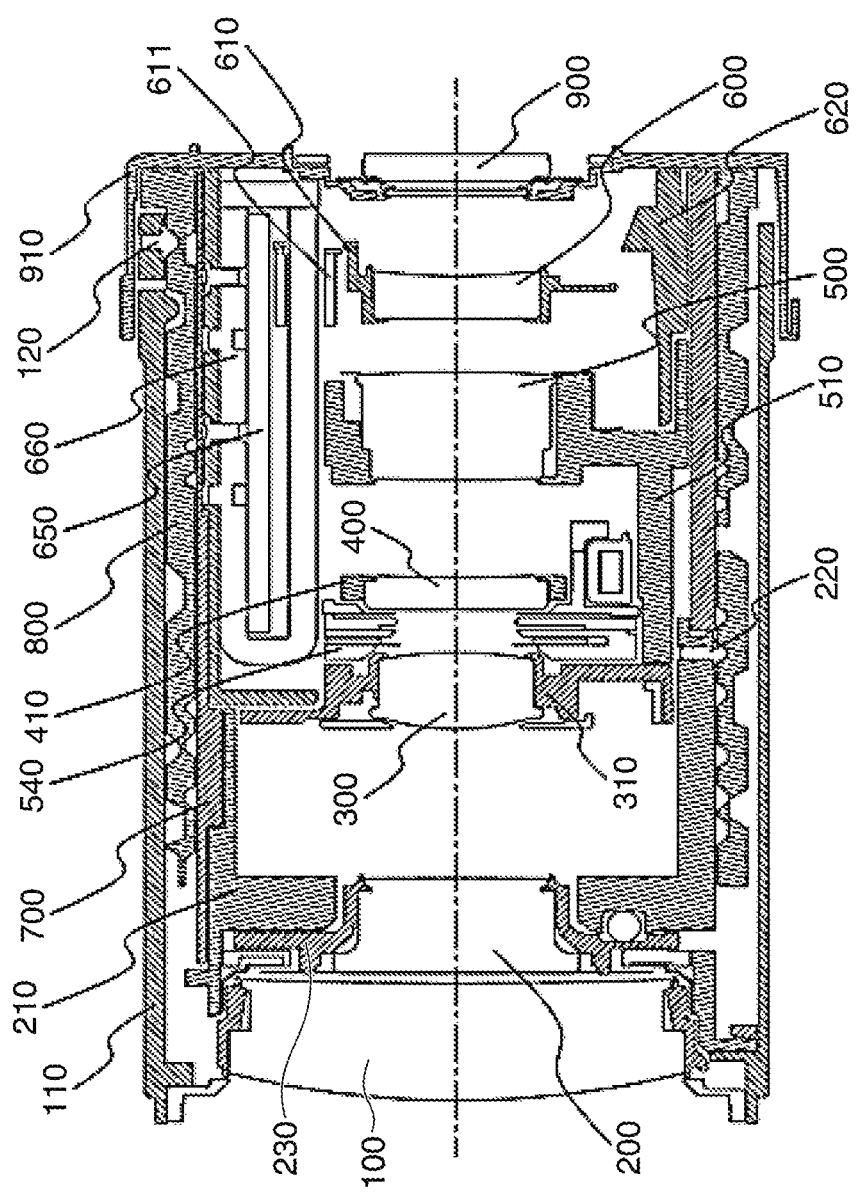
FIG. 3 is a cross-sectional view showing the lens barrel in FIG. 1 in a retracted position.
Figure 4:
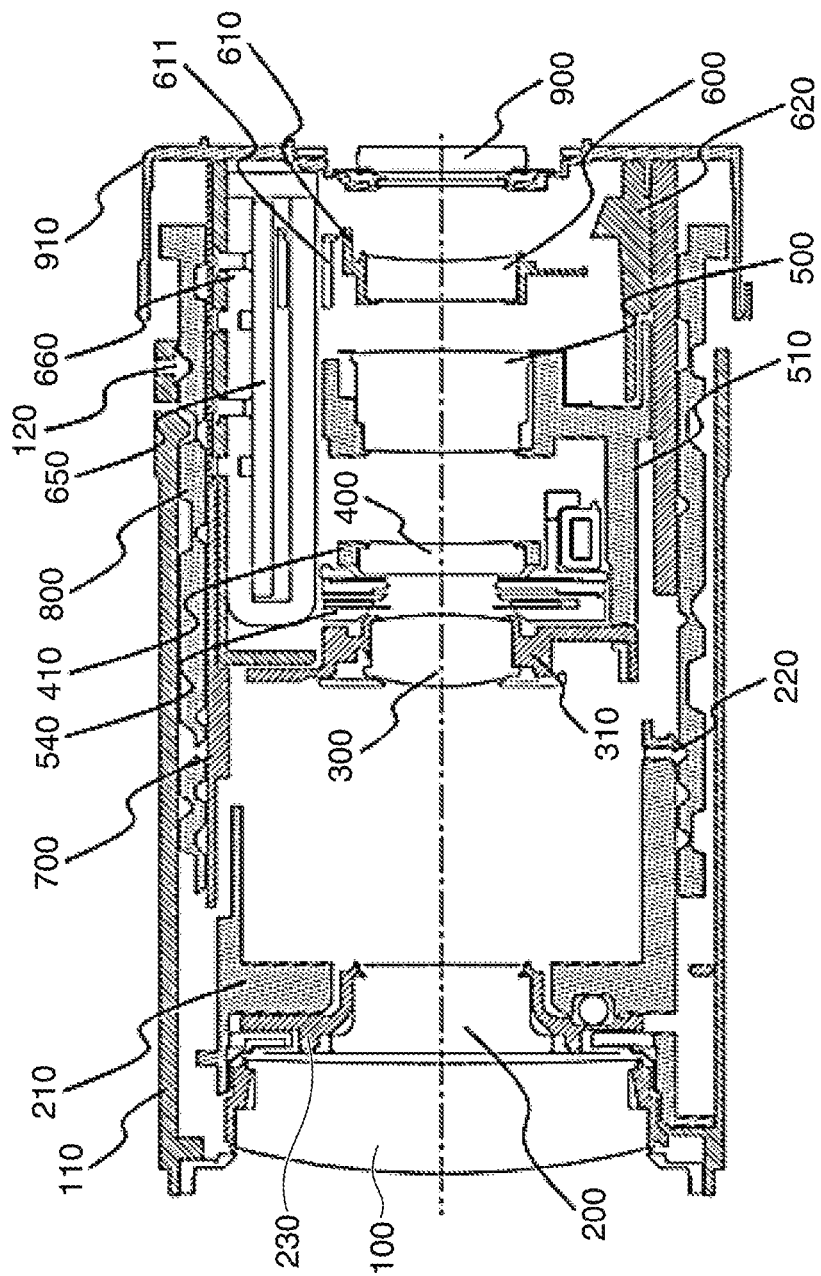
FIG. 4 is a cross-sectional view showing the lens barrel in FIG. 1 in a shooting position (wide-angle position).
Figure 5:
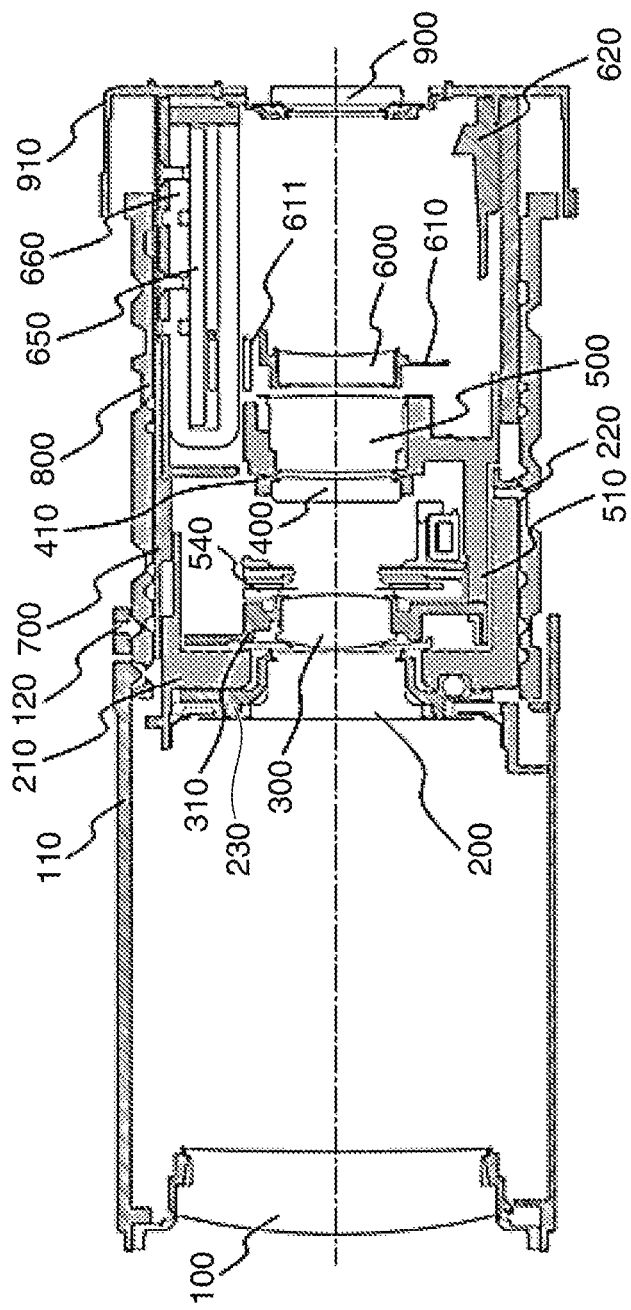
FIG. 5 is a cross-sectional view showing the lens barrel in FIG. 1 in a shooting position (telephoto position).

FIG. 1 is a perspective view showing a lens barrel according to the embodiment of the present invention. FIG. 2 is an exploded perspective view showing the lens barrel in FIG. 1. FIG. 3 is a cross-sectional view showing the lens barrel in FIG. 1 in a retracted position. FIG. 4 is a cross-sectional view showing the lens barrel in FIG. 1 in a shooting position (wide-angle position). FIG. 5 is a cross-sectional view showing the lens barrel in FIG. 1 in a shooting position (telephoto position). It should be noted that the lens barrel taken for example in the present embodiment is a zoom type mounted on an image pickup apparatus such as a film camera, a digital camera, or a digital video camera.

Referring to FIGS. 1 to 5, the lens barrel 10 according to the present embodiment has a group-1 lens holder 110, a group-2 lens holder 230 (lens holding member), a group-3 lens holder 310, a group-4 lens holder 410, a group-5 lens holder 510, a group-6 lens holder 610, a fixed cylinder 700, and a cam cylinder 800.

The group-1 lens holder 110 holds a group-1 lens 100. On an outer periphery of an end portion of the group-1 lens holder 110 on an image plane side, three follower pins 120 are provided in a circumferential direction at substantially regular intervals. The group-1 lens holder 110 corresponds to an exemplary first cylinder according to the present invention.

The group-2 lens holder 230 holds a group-2 lens 200 which is a shift lens (vibration-insulating lens) and is supported movably with respect to a group-2 base 210 within a plane perpendicular to an optical axis. On an outer periphery of an end portion of the group-2 lens base 210 on an image plane side, three follower pins 220 are provided at substantially regular intervals in a circumferential direction. The group-2 lens holder 210 corresponds to an exemplary second cylinder according to the present invention.

The group-3 lens holder 310 holds a group-3 lens 300, and the group-4 lens holder 410 holds a group-4 lens 400. The group-4 lens holder 410 is provided with a follower pin 420.

The group-5 lens holder 510 holds a group-5 lens 500. The group-5 lens holder 510 is provided with a follower pin 520 and a static pin 530 (not shown). The group-3 lens holder 310 and a light quantity adjusting member 540 are fixed to the group-5 lens holder 510 by screws or the like.

The group-6 lens holder 610 holds a group-6 lens 600, which is a focus lens, and is supported movably in the direction of the optical axis by two guide bars 630 and 640 fixed to a group-6 base 620. Three static pins 621 are formed integrally with the group-6 base 620 at substantially regular intervals in a circumferential direction.

A yoke 660, which is placed so as to surround a magnet 650, is fixed to the group-6 base 620. A coil 611 is fixed to the group-6 lens holder 610 by bonding or the like. The coil 611 is externally fitted on the yoke 660 and opposed to the magnet 650 in a radial direction. Thus, when electric current is passed through the coil 611 of the group-6 lens holder 610, a magnetic field of the magnet 650 exerts a Lorentz force on the coil 611, and this actuates the group-6 lens holder 610 in the direction of the optical axis to attain focus.

Figure 6:
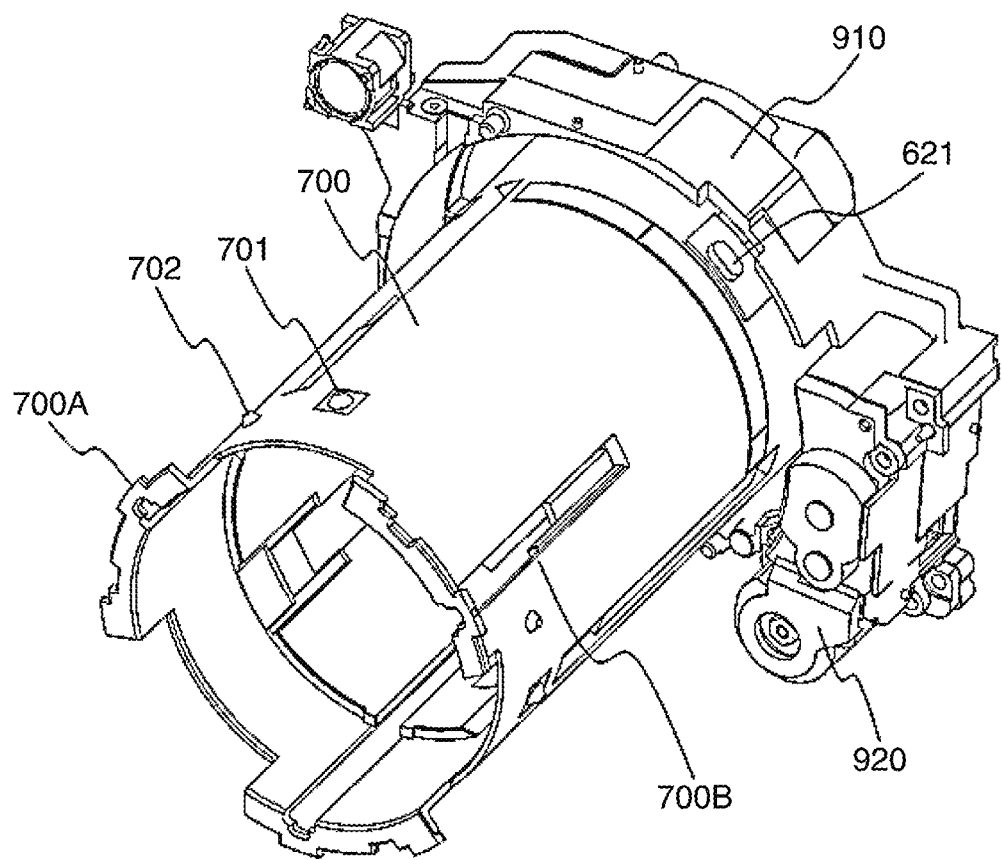
FIG. 6 is a perspective view showing an assembly of a fixed cylinder, a group-6 base, and a sensor holder.
Figure 7:
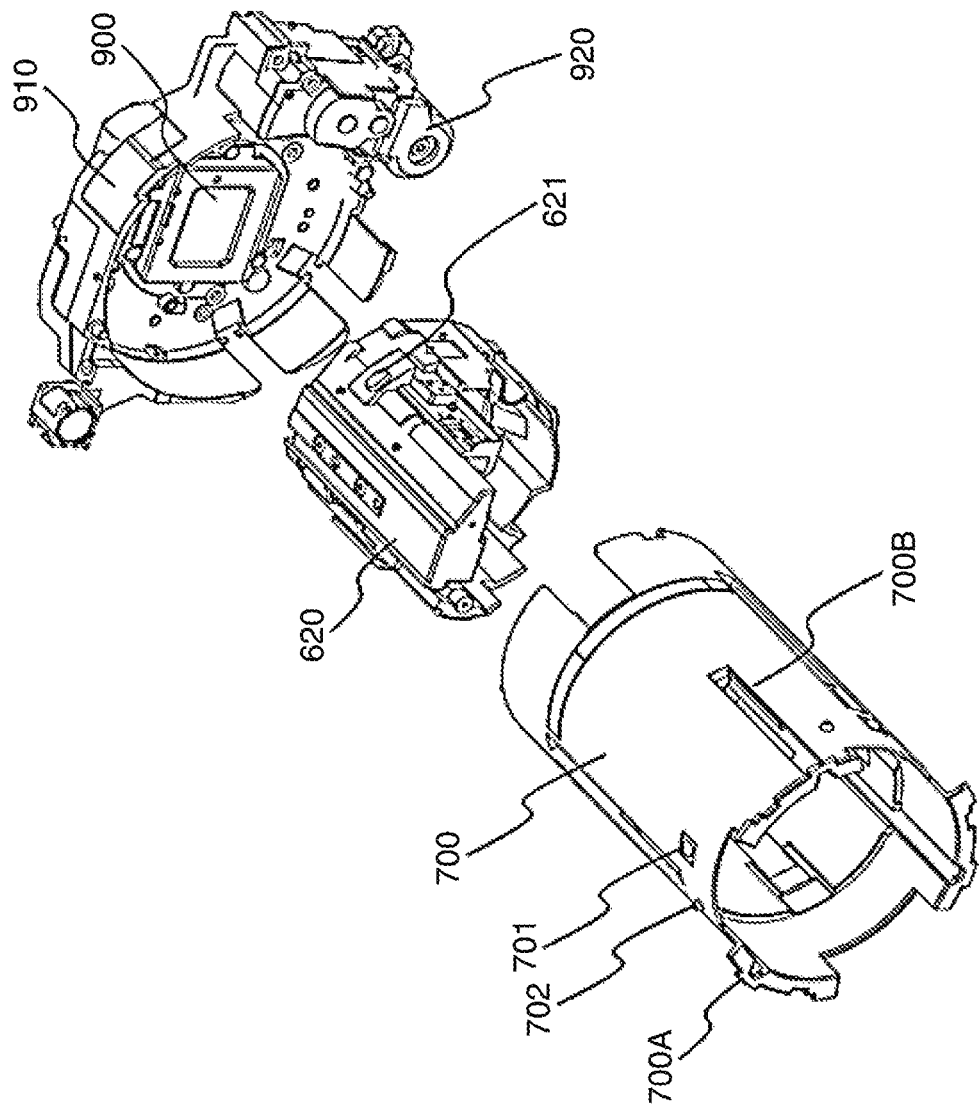
FIG. 7 is a perspective view showing the fixed cylinder, the group-6 base, and the sensor holder in a disassembled state.

FIG. 6 is a perspective view showing an assembly of the fixed cylinder 700, the group-6 base 620, and a sensor holder 910. FIG. 7 is a perspective view showing the fixed cylinder 700, the group-6 base 620, and the sensor holder 910 in a disassembled state.

Referring to FIGS. 6 and 7, the sensor holder 910 holds an image pickup device 900. The sensor holder 910 is equipped with a zoom drive unit 920. The group-6 base 620 and the fixed cylinder 700 are fixed to the sensor holder 910 by screws or the like.

The fixed cylinder 700 restricts rotation of the group-1 lens holder 110, the group-2 lens holder 230 (the group-2 base 210), the group-4 lens holder 410, the group-5 lens holder 510, and the group-6 lens holder 610. On an outer peripheral portion of the fixed cylinder 700, three follower pins 701 and three static pins 702 are formed integrally with the fixed cylinder 700 at substantially regular intervals in a circumferential direction.

Also, on the outer peripheral portion of the fixed cylinder 700, three straight advance keys 700A and three first straight advance grooves 700B (third straight advance groove) are provided at substantially regular intervals in a circumferential direction, and the straight advance keys 700A and the first straight advance grooves 700B restrict rotation of the group-1 lens holder 110 and the group-2 base 210 which move in the direction of the optical axis. Further, guide bars 710 and 720 (see FIG. 2) are incorporated into the fixed cylinder 700 and guide the group-4 lens holder 410 and the group-5 lens holder 510 movably in the direction of the optical axis while restricting rotation thereof.

Figure 8:
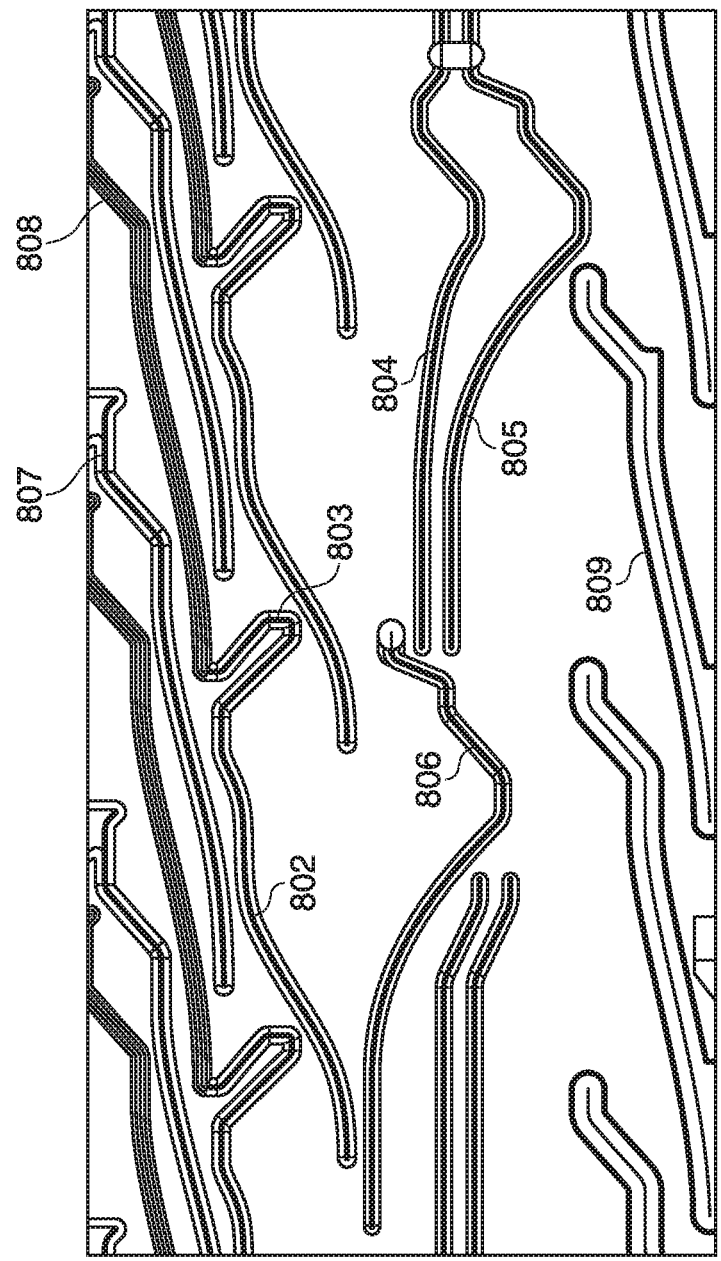
FIG. 8 is a developed view showing a cam cylinder on an inner peripheral side.

FIG. 8 is a developed view showing the cam cylinder 800 on an inner peripheral side. Rotation of the cam cylinder 800 moves the group-1 lens holder 110, the group-2 lens holder 230 (the group-2 base 210), the group-4 lens holder 410, the group-5 lens holder 510, and the group-6 lens holder 610 in the direction of the optical axis.

On an outer peripheral portion of the cam cylinder 800, group-1 cam grooves 801 (see FIG. 2), which the follower pins 120 of the group-1 lens holder 110 are engaged with and follow, are formed. On an inner peripheral portion of the cam cylinder 800, cam grooves 802, 804, 805, and 807 and cam grooves 806, 808, and 809 are formed as shown in FIG. 8.

The follower pins 220 of the group-2 base 210 are cam-engaged with the cam grooves 802, the follower pin 420 of the group-4 base 410 is cam-engaged with the cam groove 804, and the follower pin 520 of the group-5 base 510 is cam-engaged with the cam groove 805. The follower pins 701 of the fixed cylinder 700 are cam-engaged with the cam grooves 807.

The cam grooves 806, 808, and 809 are opposed in a radial direction to the static pin 530 of the group-5 lens holder 510, the static pins 702 of the fixed cylinder 700, and the static pins 621 of the group-6 base 620, respectively, with predetermined clearances left. It should be noted that the cam groove 805 and the cam groove 806 take the same path, and also, the cam grooves 807 and the cam grooves 808 take the same path.

Referring to FIG. 8, the cam grooves 807 and 808 for the follower pins 701 and the static pins 702 of the fixed cylinder 700 are opened on a subject side (upper side as viewed in FIG. 8), and the cam grooves 809 for the static pins 621 of the group-6 base 620 are opened on an image plane side. Therefore, the fixed cylinder 700 is fitted into the cam cylinder 800 from the subject side, and the group-6 base 620 is fitted into the cam cylinder 800 from the image plane side.

On an outer periphery of an end portion of the cam cylinder 800 on the image plane side, a gear unit 810 (see FIG. 2) is provided, and a gear train, not shown, of the zoom drive unit 920 is meshed with the gear unit 810. This transmits power of the zoom drive unit 920 to the gear unit 810 and rotatively drives the cam cylinder 800.

A description will now be given of a zooming action of the lens barrel 10 constructed as described above. First, when electric current is passed through a zoom motor, not shown, of the zoom drive unit 920, power of the zoom motor is transmitted to the cam cylinder 800 via the gear unit 801 meshed with the gear train connected to the zoom motor. This rotatively drives the cam cylinder 800 and causes the cam grooves 807 to be cam-engaged with the follower pins 701 of the fixed cylinder 700 fixed to the sensor holder 901, causing the cam cylinder 800 to move along the cam grooves 807 in the direction of the optical axis while rotating.

As the cam cylinder 800 rotates, the group-1 lens holder 110 of which the follower pins 220 are engaged with the group-1 cam grooves 801 (see FIG. 2) follows the group-1 cam grooves 801 to move in the direction of the optical axis. Also, the group-2 base 210 of which the follower pins 220 are engaged with the cam groove 802 follows the cam grooves 802 to move in the direction of the optical axis, and the group-4 lens holder 410 of which the follower pins 420 are engaged with the cam groove 804 follows the cam grooves 804 to move in the direction of the optical axis. Further, as the cam cylinder 800 rotates, the group-5 lens holder 510 of which the follower pin 520 is engaged with the cam groove 805 follows the cam groove 805 to move in the direction of the optical axis.

At this time, as described earlier, the first straight advance keys 700A and the first straight advance grooves 700B of the fixed cylinder 700 inhibit rotation of the group-1 lens holder 110 and the group-2 base 210 moving in the direction of the optical axis. Also, the guide bars 710 and 720 inhibit rotation of the group-4 lens holder 410 and the group-5 lens holder 510 moving in the direction of the optical axis.

Thus, zooming is performed by combining the amount of movement of the cam cylinder 800 itself in the direction of the optical axis and the amounts of movement of the respective lens holders 110, 230, 410, and 510 in the direction of the optical axis with respect to the cam cylinder 800 and changing intervals among the lens groups in the direction of the optical axis. It should be noted that how the group-3 lens holder 310 is actuated will be described later.

Figure 9:
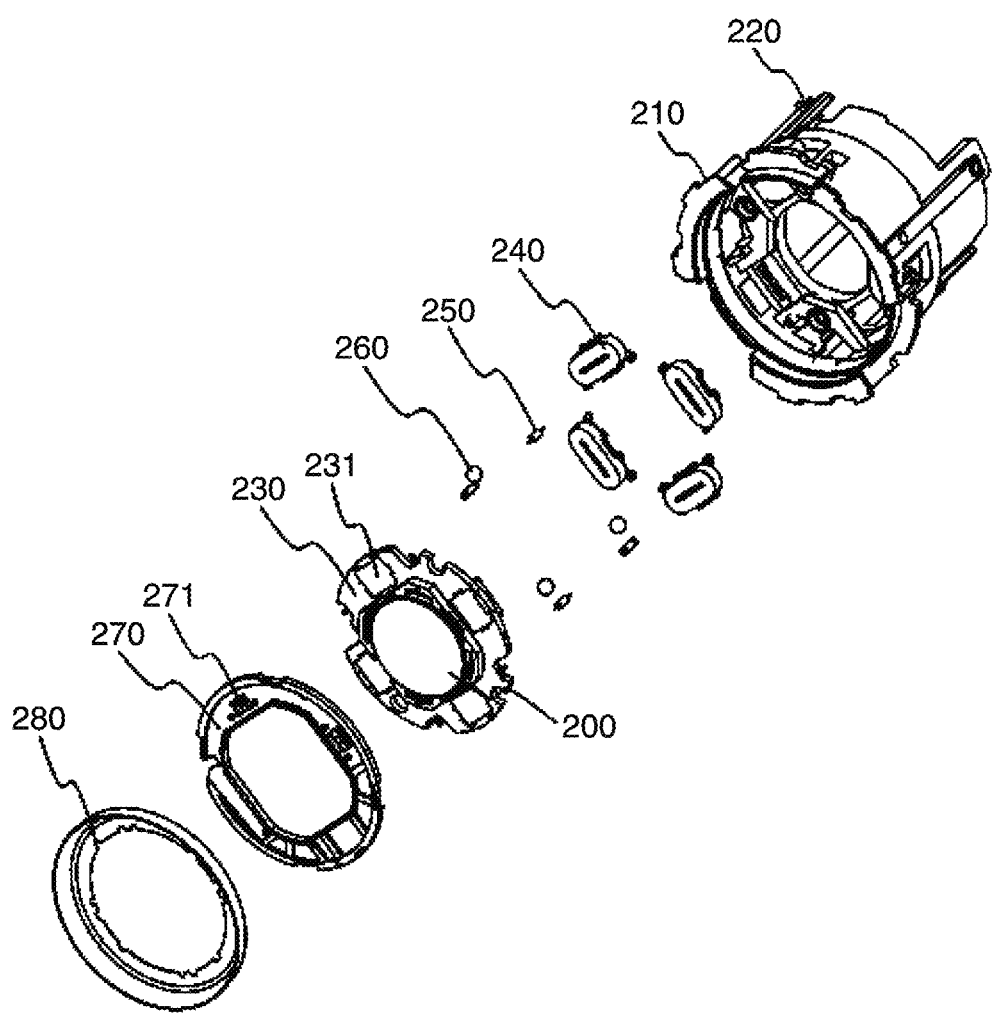
FIG. 9 is an exploded perspective view showing a group-2 unit.

Referring next to FIG. 9, a description will be given of a group-2 unit which constitutes the image blur correction mechanism. FIG. 9 is an exploded perspective view showing the group-2 unit. Referring to FIG. 9, the group-2 unit has the group-2 lens holder 230 and the group-2 base 210, and four magnets 231 are formed integrally with the group-2 lens holder 230 by insert molding. Four coils 240 are fixed to the group-2 base 210 at such locations as to be opposed in a radial direction to the respective four magnets 230 of the group-2 lens holder 230.

The group-2 lens holder 230 and the group-2 base 210 are assembled with three ball members 260 sandwiched between them in the direction of the optical axis through urging force of four coil springs 250. Hole device holder 270 holds two hole devices 271 that detect magnetic fields of the two magnets 231 located perpendicular to each other among the four magnets 231 of the group-2 lens holder 230. The hole device holder 270 is fixed to the group-2 base 210 in a state of being sandwiched between a group-2 cover 280 and the group-2 base 210.

Figure 10:
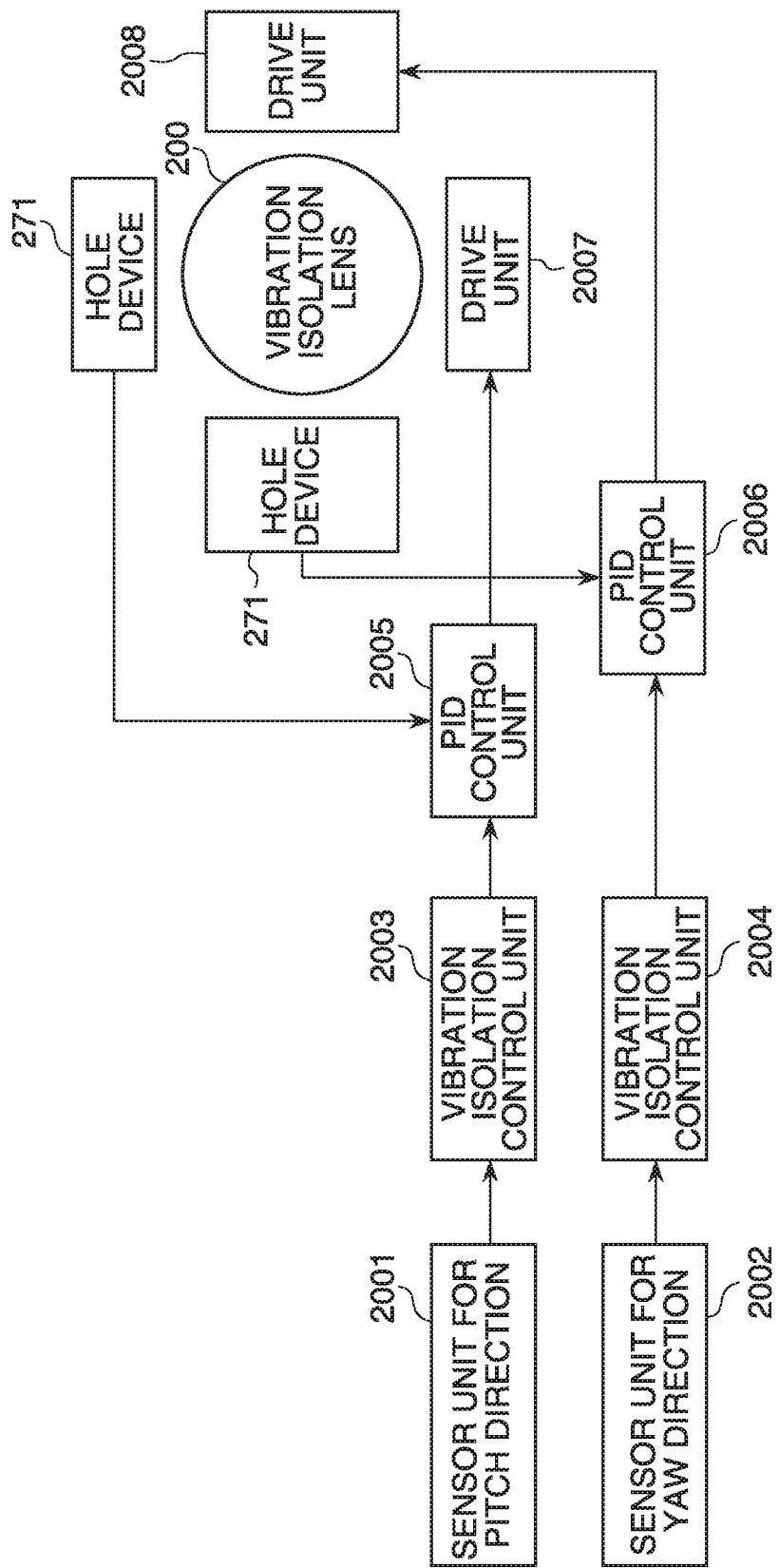
FIG. 10 is a block diagram showing a control unit that controls the group-2 unit.

Referring next to FIGS. 9 and 10, a description will be given of image blur correction control using the group-2 unit. FIG. 10 is a block diagram showing a control unit that controls the group-2 unit.

Referring to FIG. 9, in a drive unit of the group-2 unit, the hole device 271, the magnets 231, and the coils 240 are placed in this order from the subject side to the image plane side. When electric current is passed through the coils 240, magnetic fields of the magnets 231 cause the Lorentz force to be generated in the coils 240, and its reactive force acts on the magnets 231. Since the coils 240 are fixed to the group-2 base 210, the reactive force enables the group-2 lens holder 230 holding the group-2 lens 200 to freely move within a plane perpendicular to the optical axis with respect to the group-2 base 210 through rolling of three ball members 260. The hole device 271 detects magnetic fields of the magnets 231 and detects a position of the group-2 lens holder 230 within the plane perpendicular to the optical axis.

Referring to FIG. 10, a sensor unit 2001 for a pitch direction is comprised of, for example, an angular velocity sensor and detects vibrations (deflections) of the lens barrel 10 in a vertical direction (pitch direction) in a normal position (such a position that a longitudinal direction of an image frame substantially corresponds to a horizontal direction). A sensor unit 2002 for a yaw direction is comprised of, for example, an angular velocity sensor and detects vibrations (deflection) of the lens barrel 10 in a horizontal direction (yaw direction) in the normal position.

Vibration isolation control units 2003 and 2004 each provide vibration isolation control in the pitch direction and the yaw direction and positional control for the group-2 lens 200 (the group-2 lens holder 230) according to situations. The vibration isolation control units 2003 and 2004 determine target positions for driving the group-2 lens 200 so as to correct for an image blur of a subject caused by deflections of the lens barrel 10 detected by the sensor units 2001 and 2002 and generate correcting position control signals indicative of the determined target positions.

PID control units 2005 and 2006 determine control amounts based on the correcting position control signals for the pitch direction and the yaw direction and signals indicative of positions of the group-2 lens 200 and output position command signals. Based on the position command signals sent from the respective PID control units 2005 and 2006, drive units 2007 and 2008 drive the group-2 lens 200 in a direction perpendicular to the optical axis. In the present embodiment, the drive units 2007 and 2008 are comprised of the magnets 231 and the coils 240.

A description will now be given of how the position of the group-2 lens 200 in the group-2 unit is controlled. In positional control for the group-2 lens 200, the group-2 lens 200 is driven in the pitch direction and the yaw direction based on deflection signals (angular velocity signals) indicative of deflections of the lens barrel 10 in the pitch direction and the yaw direction from the sensor unit 2001 for the pitch direction and the sensor unit 2002 for the yaw direction. Then, the hole device 271 detects the magnetic fields of the magnet 231, and positional signals for the second lens 200 are transmitted to the PID control units 2005 and 2006, respectively.

The PID control units 2005 and 2006 provide such feedback control that position signals for the group-2 lens 200 converge on respective correcting position control signals sent from the vibration isolation control units 2003 and 2004. According to detected positions of the group-2 lens 200, the PID control units 2005 and 2006 provide feedback control of the drive units 2007 and 2008 so that the group-2 lens 200 can be driven to target positions determined by the vibration isolation control units 2003 and 2004.

At this time, the PID control units 2005 and 2006 provide PID control which is a combination of P (proportional) control, I (integral) control, and D (differential) control. Based on deflection information supplied from the sensor unit 2001 for the pitch direction and the sensor unit 2002 for the yaw direction, the vibration isolation control units 2003 and 2004 output correcting position control signals which cause the group-2 lens 200 to shift in such directions as to correct for image blur. This prevents blurring of a subject image formed on a light-incident surface even when deflection of the lens barrel 10 occurs due to camera shake or the like.

Figure 11:
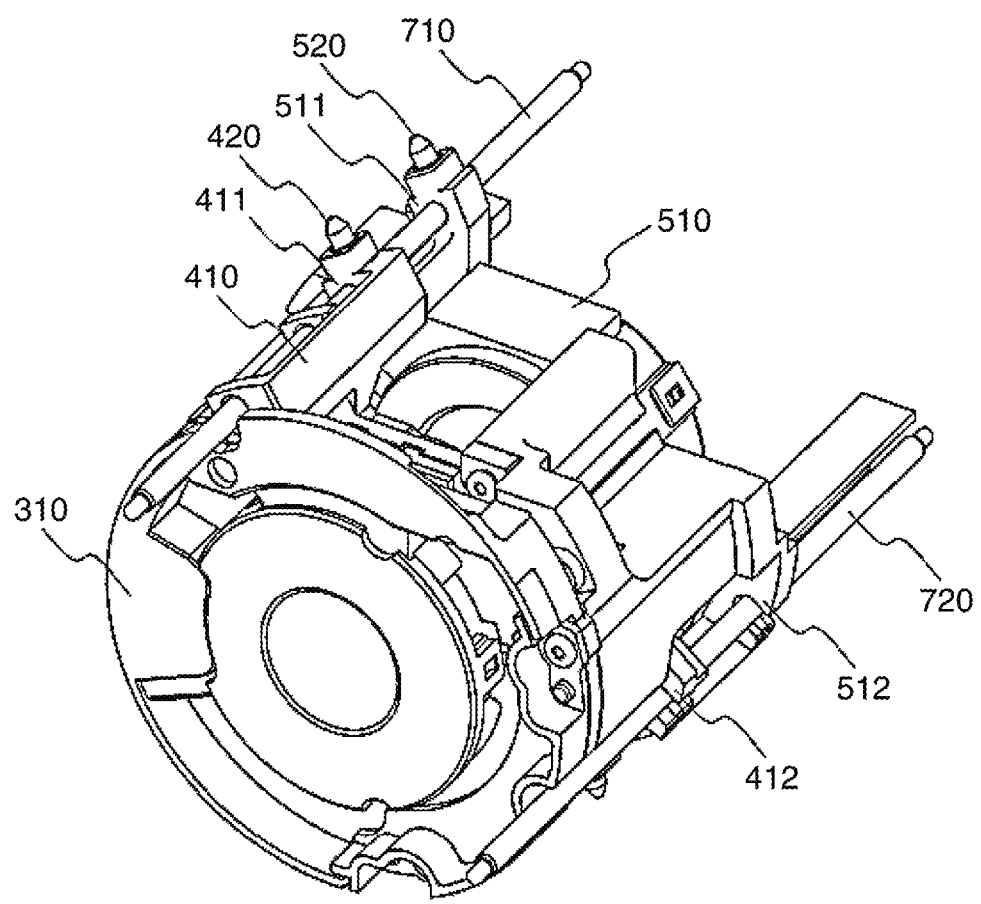
FIG. 11 is a perspective view showing an assembly of a group-3 lens holder, a group-4 lens holder, and a group-5 lens holder.

Referring next to FIGS. 3 to 5 and 11, a description will be given of the relationship among the group-3 lens holder 310, the group-4 lens holder 410, and the group-5 lens holder 510. FIG. 11 is a perspective view showing an assembly of the group-3 lens holder 310, the group-4 lens holder 410, and the group-5 lens holder 510.

Referring to FIG. 11, a hole portion 411 of the group-4 lens holder 410 and a hole portion 511 of the group-5 lens holder 510 are fitted on the guide bar 710. The guide bar 720 is engaged with a rotation inhibiting portion 412 of the group-4 lens holder 410 and a rotation inhibiting portion 512 of the group-5 lens holder 510. Thus, the group-4 lens holder 410 and the group-5 lens holder 510 are supported movably in the direction of the optical axis while being inhibited from rotating by the guide bars 710 and 720.

The group-3 lens holder 310 and the light quantity adjusting member 540 (see FIGS. 3 to 5) are fixed on the group-5 lens holder 510 by screws or the like such that the group-4 lens holder 410 is sandwiched between them. The group-4 lens holder 410 is provided with the follower pin 420 which is to be engaged with the cam grooves 804, and the group-5 lens holder 510 is provided with the follower pin 520 which is to be engaged with the cam groove 805. As a result, rotation of the cam cylinder 800 causes the group-5 lens holder 510 to move in the direction of the optical axis integrally with the group-3 lens holder 310 and the light quantity adjusting member 540 and causes the group-4 lens holder 410 to move in the direction of the optical axis between the light quantity adjusting member 540 and the group-5 lens holder 510.

The static pin 530 is incorporated in the group-5 lens holder 510 so as to prevent the follower pins 520 from falling off the cam groove 805 and prevent portions around the follower pin 520 from becoming deformed or broken when the group-5 lens holder 510 is subjected to external force due to drop impact or the like. The cam groove 806 for the static pin 530 is spaced a predetermined amount from the static pin 530, and during normal zooming, the cam groove 806 and the static pin 530 do not come into contact with each other, and only when subjected to external force due to drop impact or the like, they come into contact with each other.

Referring next to FIGS. 12 to 20, a description will be given of the relationship among the group-1 lens holder 110, the group-2 base 210, and the fixed cylinder 700.

Figure 12:
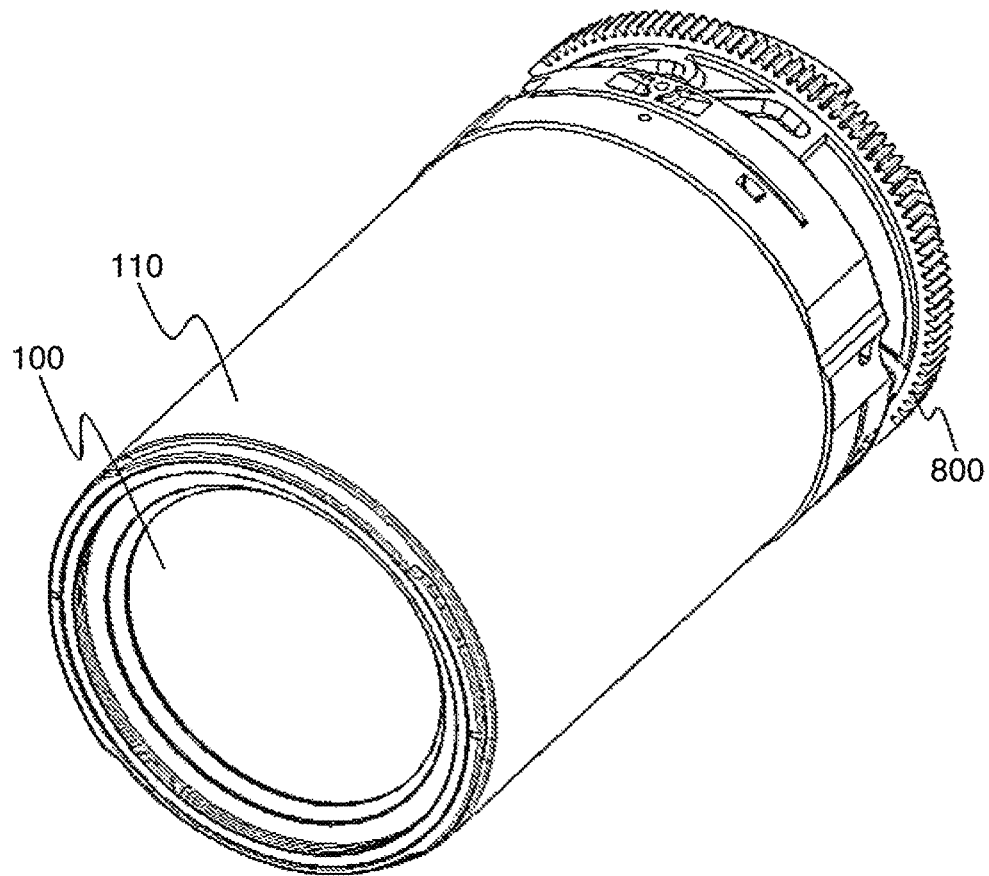
FIG. 12 is a partial perspective view showing the lens barrel in the shooting position (wide-angle position).

FIG. 12 is a partial perspective view showing the lens barrel 10 in the shooting position (wide-angle position). The group-2 unit comprised of the group-2 lens holder 230 and the group-2 base 210 is disposed inside the group-1 lens holder 110 and the cam cylinder 800.

Figure 13:
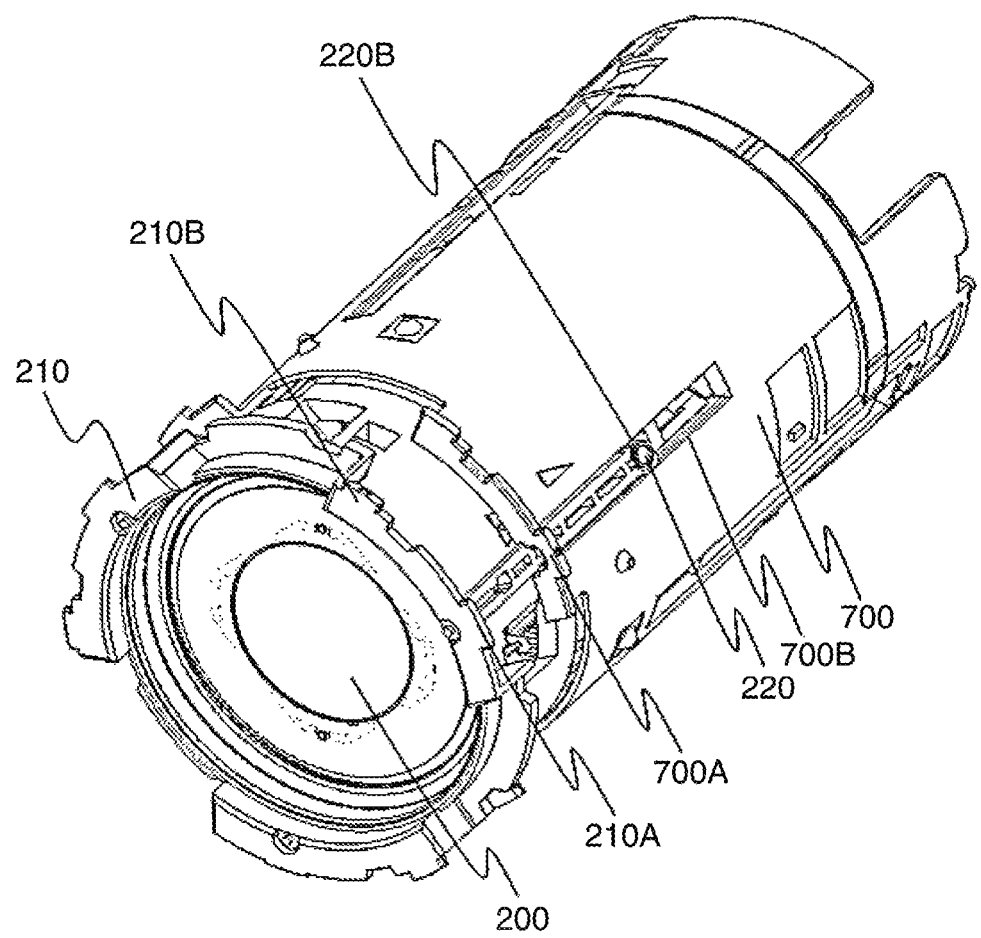
FIG. 13 is a perspective view showing the relationship between the group-2 unit and the fixed cylinder in the lens barrel in the shooting position (wide-angle position).

FIG. 13 is al perspective view showing the relationship between the group-2 unit and the fixed cylinder 700 in the lens barrel 10 in the shooting position (wide-angle position). Referring to FIG. 13, second straight advance keys 210A (second vibration isolation pins) of the group-2 base 210, first straight advance keys 220B (straight advance pins) around the follower pins 220 of the group-2 base 210, and the straight advance keys 700A and the first straight advance grooves 700B of the fixed cylinder 700 are placed in the same phase and overlap in the direction of the optical axis.

A barycenter position of the group-2 unit lies between a plane perpendicular to the direction of the optical axis at the first straight advance keys 220B of the group-2 base 210 and a plane perpendicular to the direction of the optical axis at the second advance keys 210A of the group-2 base 210.

Of the first straight advance keys 220B and the second advance keys 210A which are spaced from each other in the direction of the optical axis of the group-2 base 210, the first straight advance keys 220B disposed on the image plane side are fitted in the first straight advance grooves 700B of the fixed cylinder 700 to act as a main guide. On the other hand, the second straight advance keys 210A disposed on the subject side are pressed and fitted into second straight advance grooves 110A (second straight advance grooves) (see FIG. 15) of the group-1 lens holder 110 to act as a sub guide.

The force with which the second straight advance keys 210A and the second straight advance grooves 110A are fitted together is set at a greater value than the force with which the first straight advance keys 220B and the first straight advance groove 700B are fitted together. It should be noted that areas where the second straight advance keys 210A are pressed and fitted into the second straight advance grooves 110A may be configured such that loads are charged inwardly in a radial direction through fitting with spring property.

Figure 14:
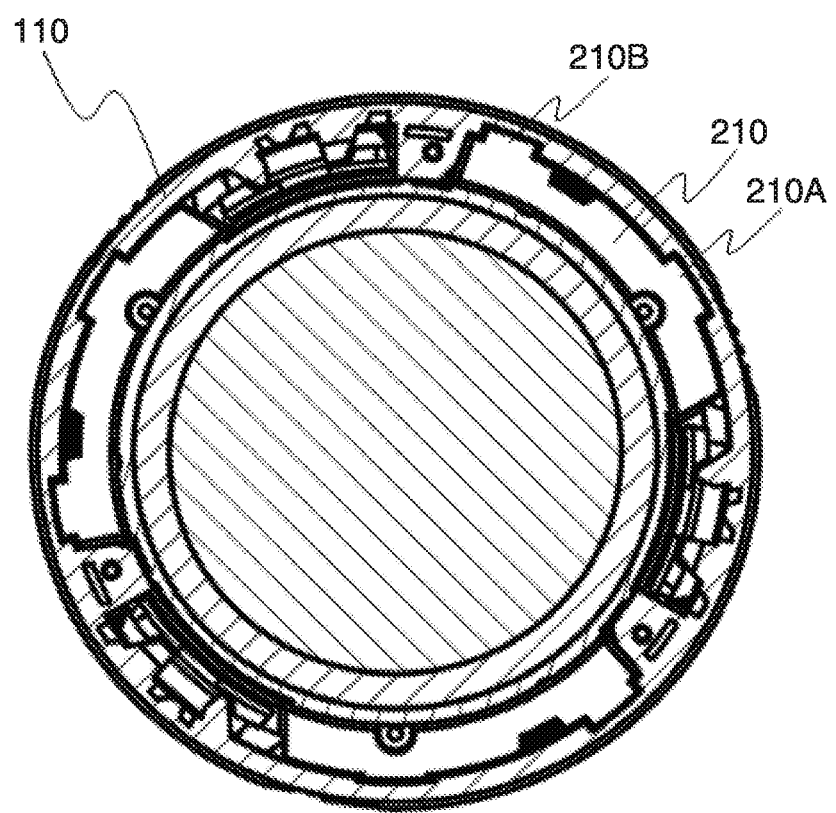
FIG. 14 is a cross-sectional view showing the group-2 base at second straight advance keys in a direction perpendicular to an optical axis.
Figure 15:
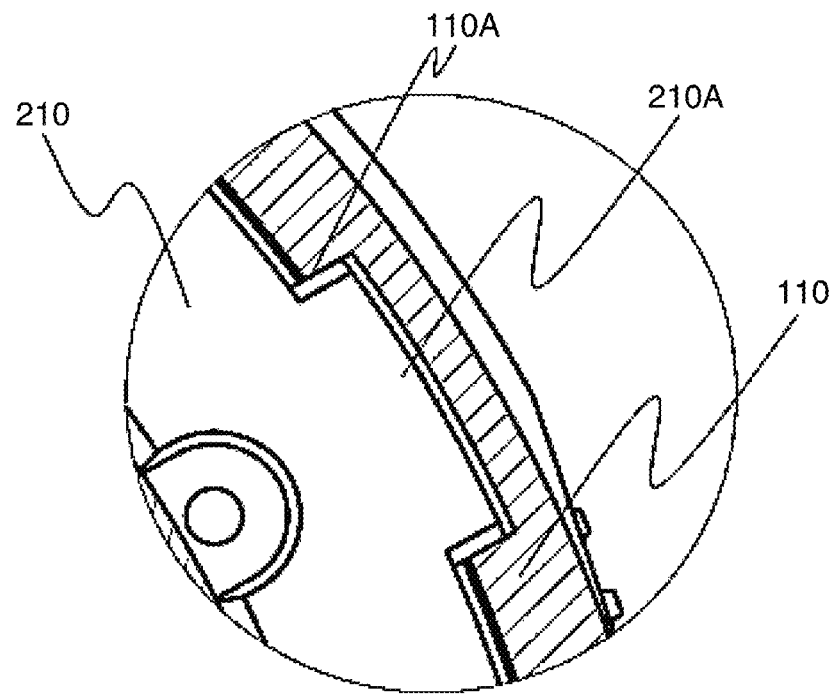
FIG. 15 is a partial enlarged view of FIG. 14.

FIG. 14 is a cross-sectional view showing the group-2 base 210 at the second straight advance keys 210A in a direction perpendicular to the optical axis. FIG. 15 is a partial enlarged view of FIG. 14. As shown in FIGS. 14 and 15, the second straight advance keys 210A of the group-2 base 210 are pressed and fitted into the second straight advance grooves 110A formed on the inner peripheral portion of the group-1 lens holder 110 in a radial direction. This causes the group-2 base 210 and the group-1 lens holder 110 to move straight relatively to each other in the direction of the optical axis while being inhibited from rotating. The second straight advance keys 210A of the group-2 base 210, which are placed in the same phase as the straight advance grooves 700b of the fixed cylinder 700 and overlap in the direction of the optical axis as described earlier, are placed at positions where the straight advance grooves 700B cannot be seen in the direction of the optical axis.

Figure 16:
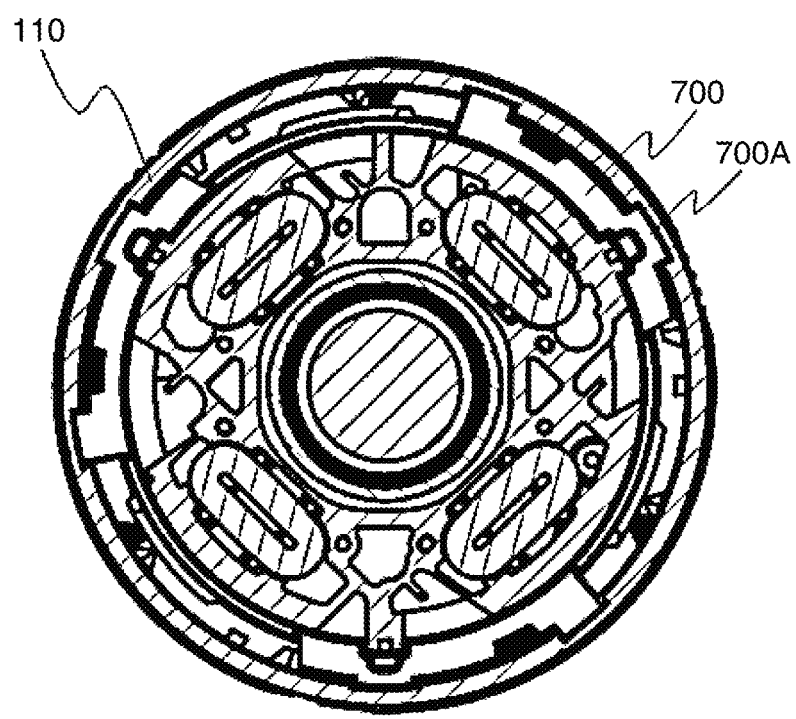
FIG. 16 is a cross-sectional view showing the fixed cylinder at straight advance keys in a direction perpendicular to the optical axis.
Figure 17:
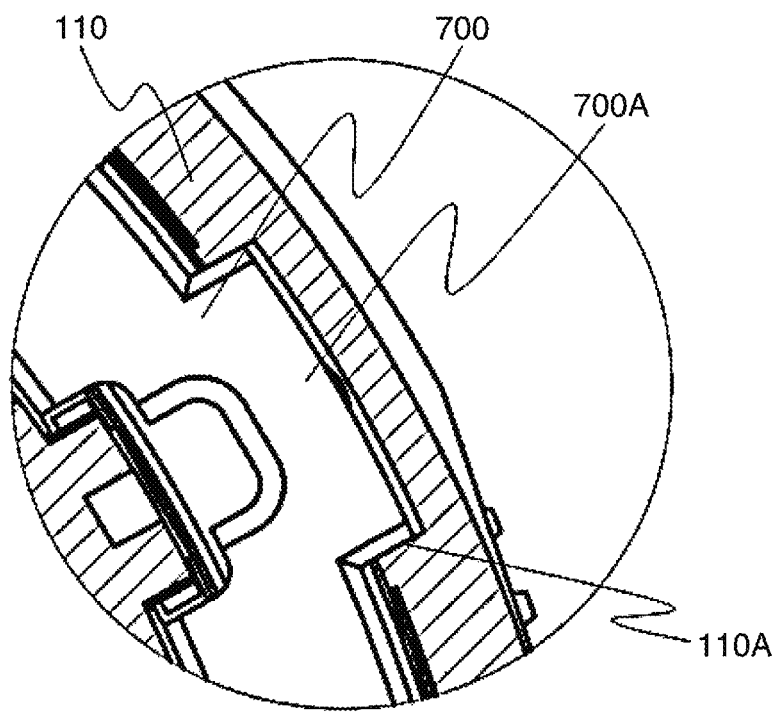
FIG. 17 is a partial enlarged view of FIG. 16.

FIG. 16 is a cross-sectional view showing the fixed cylinder 700 in FIG. 13 at the straight advance keys 700A in a direction perpendicular to the optical axis. FIG. 17 is a partial enlarged view of FIG. 16. As shown in FIGS. 16 and 17, the straight advance keys 700A of the fixed cylinder 700 are fitted into the second straight advance grooves 110A formed on the inner peripheral portion of the group-1 lens holder 110 in a radial direction. This causes the group-1 lens holder 110 to move straight in the direction of the optical axis while being inhibited from rotating with respect to the fixed cylinder 700.

Figure 18:
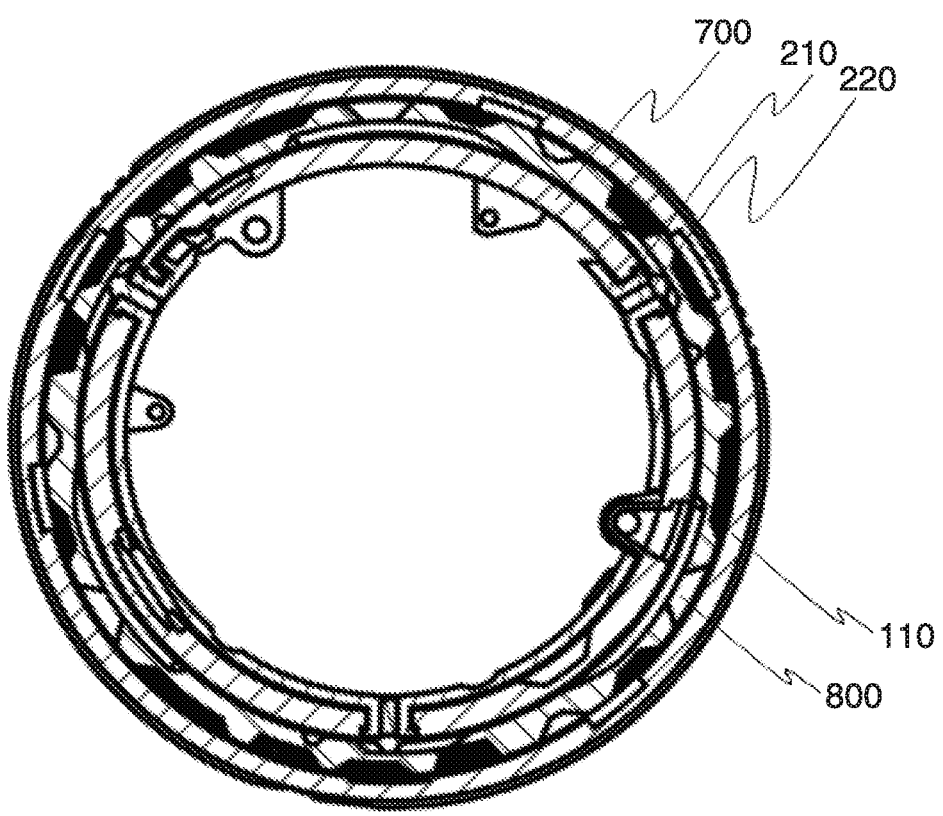
FIG. 18 is a cross-sectional view showing the group-2 base at follower pins in a direction perpendicular to the optical axis.
Figure 19:
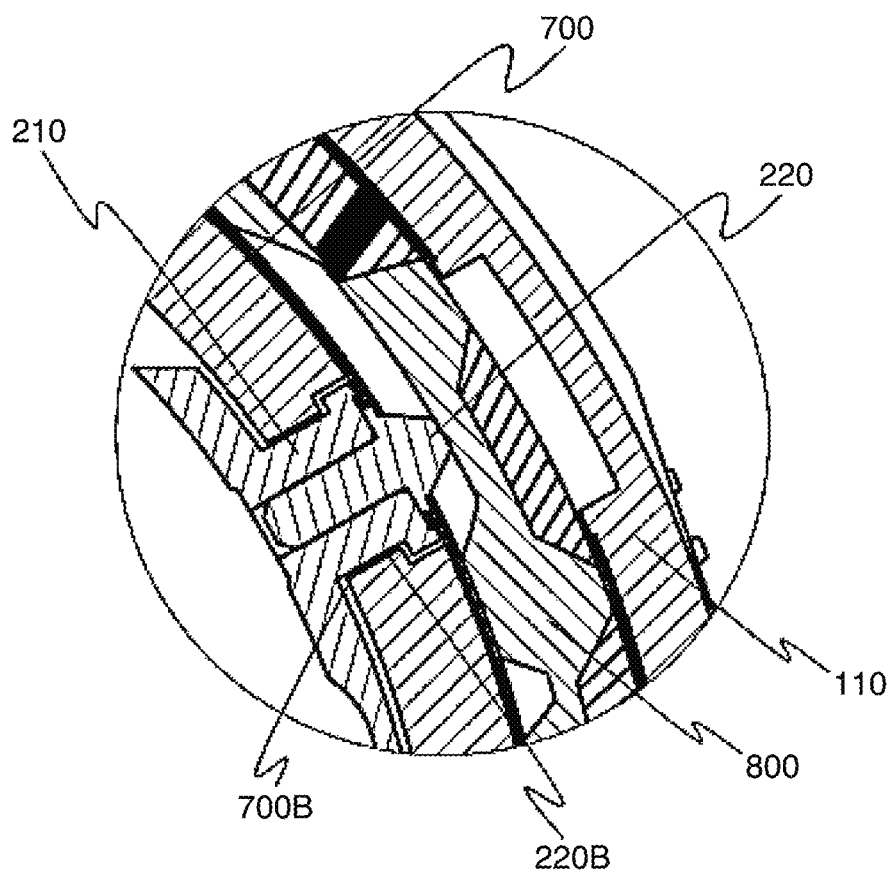
FIG. 19 is a partial enlarged view of FIG. 18.

FIG. 18 is a cross-sectional view showing the group-2 base 210 in FIG. 13 at the follower pins 220 in a direction perpendicular to the optical axis. FIG. 19 is a partial enlarged view of FIG. 18. As shown in FIGS. 18 and 19, the first straight advance keys 220B placed around the follower pins 220 of the group-2 base 210 are fitted into the first straight advance grooves 700B formed on the inner peripheral portion of the fixed cylinder 700 in a radial direction. This causes the group-2 base 210 to move in the direction of the optical axis while being inhibited from rotating with respect to the fixed cylinder 700.

Thus, the group-2 base 210 is always fitted in the group-1 lens holder 110 and the fixed cylinder 700 in a radial direction movably in the direction of the optical axis and inhibited from rotating. Namely, the second straight advance keys 210A of the group-2 base 210 and the straight advance keys 700A of the fixed cylinder 700 are fitted in the second straight advance keys 110A of the group-1 lens holder 110, and the first straight advance keys 220B of the group-2 base 210 are fitted in the first straight advance keys 700B of the fixed cylinder 700. Frictional force or the like generated in these fitting portions causes a force that reduces vibrations to act, and even when the group-2 lens holder 230 shifts with respect to the group-2 base 210 within a plane perpendicular to the optical axis, a vibration phenomenon of the lens barrel 10 arising from vibrations caused by the shift is prevented.

Figure 20:
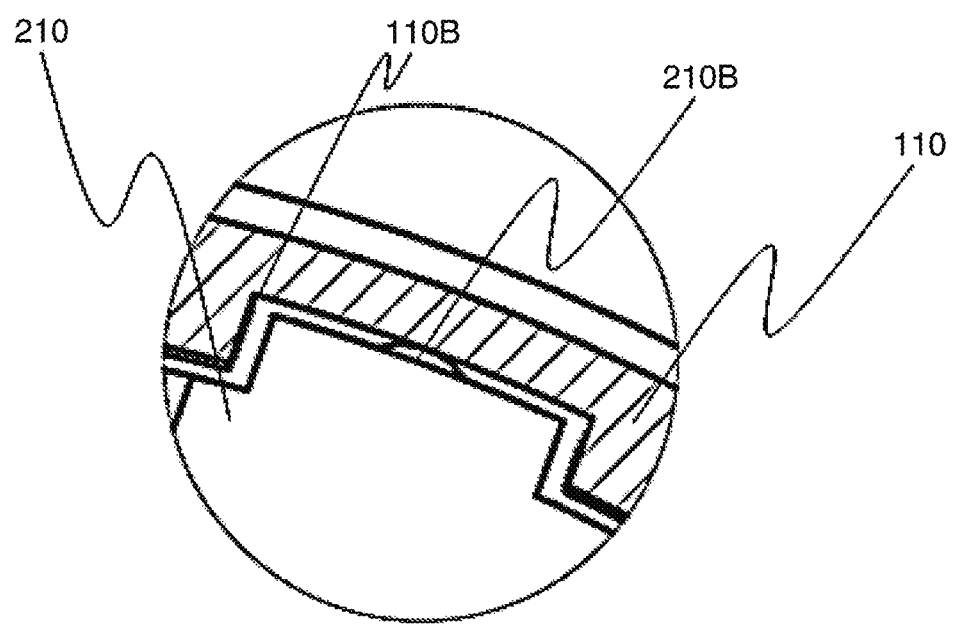
FIG. 20 is a partial enlarged view of FIG. 14 at third advance keys.

FIG. 20 is a partial enlarged view showing the group-2 210 base at third straight advance keys 210B (first vibration isolation pins) shown in FIG. 14. As shown in FIG. 20, the third straight advance keys 210B of the group-2 base 210 are fitted into third straight advance grooves 110B (first straight advance grooves) formed on an inner peripheral portion of the group-1 lens holder 110 in a radial direction. This causes the group-2 base 210 and the group-1 lens holder 110 to move relatively to each other in the direction of the optical axis while being inhibited from rotating.

The areas where the third straight advance keys 210B and the third straight advance grooves 110B are fitted together are configured such that the group-1 lens holder 110 charges loads on the group-2 base 210 inwardly in a radial direction toward a center of the optical axis. This, along with the barycenter of the group-2 unit lying between the first straight advance keys 220B and the second straight advance keys 210A, the vibration phenomenon of the lens barrel 10 described above is effectively prevented.

Assume now that the mass of a group-1 unit including the group-1 lens holder 110, the group-1 lens 100, and so forth is m1, and the mass of a part that does not shift, which is represented by the group-2 base 210 of the group-2 unit, is m2. Where constants for modeling vibrations of the respective group units as single vibrations are k1 and k2, a natural frequency of vibration when the constant is k1 is represented by a mathematical expression 1 below, and a natural frequency of vibration when the constant is k2 is represented by a mathematical expression 2 below.

$$\sqrt{\frac{k1}{m1}} \qquad \text{[Mathematical Expression 1]}$$

$$\sqrt{\frac{k2}{m2}} \qquad \text{[Mathematical Expression 2]}$$

Supposing that the group-1 unit and the part that does not shift in the group-2 unit are configured as a completely integral unit, a natural frequency of vibration is represented by a mathematical expression 3 below where a constant therefor is k12.

$$\sqrt{\frac{k12}{(m1+m2)}} \qquad \text{[Mathematical Expression 3]}$$

At this time, since the masses (m1 and m2) of the integral part in the two group units are combined together, the denominator of the mathematical expression increases, and therefore, the natural frequency of vibration is shifted to a greater degree than in the case where the group units vibrate individually. This shifts the frequency when the integral part oscillates and thus prevents the oscillation phenomenon of the lens barrel 10. Moreover, when energies of vibrations caused by movement of the group-2 lens 200, which is a shift lens, are the same, the amplitude during vibration with the same vibration energy is also decreased because the mass is increased by configuring the group-1 unit and the part that does not shift in the group-2 unit as an integral unit.

It should be noted that it is actually impossible to configure the group-lens holder 110 and the group-2 base 210 as a completely integral unit since zooming should be performed. However, as described earlier, an increased number of straight advance keys of the group-2 base 210, which are to be fitted on the group-1 lens holder 110, such as the first straight advance keys 220B and the second straight advance keys 210A are placed in front of and behind the barycenter of the group-2 base 210 as compared to the prior arts, or in the areas where the third straight advance keys 210B and the third straight advance grooves 110B are fitted together, the group-1 lens holder 110 charges loads inwardly in a radial direction toward the center of the optical axis with respect to the group-2 base 210, so that the group-1 unit and the part that does not shift in the group-2 unit are brought close to an integral state, shifting the natural frequency of vibration and also reducing the amplitude during vibration.

As described above, in the present embodiment, the oscillation phenomenon of the lens barrel 10 arising from vibrations occurring when the group-2 lens holder 230 holding the group-2 lens 200 has shifted within a plane perpendicular to the optical axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-014174, filed Jan. 28, 2015 and No. 2016-007133, filed Jan. 18, 2016 which are hereby incorporated by reference wherein in their entirety.

What is claimed is:

1. A lens barrel comprising:
   a cam cylinder;
   a first cylinder located on an outer periphery of the cam cylinder and configured to be engaged in said cam cylinder and caused to move in a direction of an optical axis by rotation of said cam cylinder;

a second cylinder located on an inner periphery of the cant cylinder and configured to support a lens holding member, which moves in a direction different from the direction of the optical axis so as to correct for an image blur, and be engaged in said cam cylinder and caused to move in the direction of the optical axis by rotation of said cam cylinder; and a fixed cylinder configured to guide said second cylinder movably in the direction of the optical axis while inhibiting rotation of said second cylinder, wherein said second cylinder comprises a plurality of first vibration isolation pins formed on an outer periphery of said second cylinder and a plurality of straight advance pins formed on the outer periphery of said second cylinder, wherein each of the first vibration isolation pins is engaged with each of first straight advance grooves formed on an inner periphery of said first cylinder movably in the direction of the optical axis, each of the straight advance pins is movably in the direction of the optical axis engaged in each of second straight advance grooves formed on said fixed cylinder, the plurality of first vibration isolation pins are arranged in a circumferential direction of said second cylinder, the plurality of straight advance pins are arranged in the circumferential direction of said second cylinder, each of the first vibration isolation pins is in contact with each the first straight advance grooves in a radial direction of said first cylinder and is not in contact with each of the first straight advance grooves in a circumferential direction of said first cylinder, each of the straight advance pins is in contact with each of the second straight advance grooves in the circumferential direction of said fixed cylinder, and the straight advance pin is on an image plane side relative to the lens holding member in the direction of the optical axis, and the first vibration isolation pin is on a subject side relative to the lens holding member in the direction of the optical axis.

2. The lens barrel according to claim 1, wherein said second cylinder comprises a plurality of second vibration isolation pins provided in a different phase from the plurality of first vibration isolation pins in a circumferential direction, and wherein each of the second vibration isolation pins is not in contact with each of third straight advance grooves, which is formed on said first cylinder, in the circumferential direction of said first cylinder, and is in contact with each of the second straight advance grooves in the radial direction of said first cylinder.

3. The lens barrel according to claim 1, the fixed cylinder configured to guide said first cylinder movably in the direction of the optical axis while inhibiting rotation of said first cylinder.

4. The lens barrel according to claim 1, wherein said second cylinder comprises a plurality of second vibration isolation pins provided in a phase different from the plurality of first vibration isolation pins in a circumferential direction.

5. The lens barrel according to claim 4, wherein the plurality of first vibration isolation pins and the plurality of straight advance pins are correspondingly disposed in the same phase in the direction of the optical axis.

6. The lens barrel according to claim 4, wherein a barycenter of an image blur correction mechanism comprising the lens holding member is located between the plurality of first vibration isolation pins and the plurality of straight advance pins in the direction of the optical axis.

7. The lens barrel according to claim 4, wherein a force with which the plurality of first vibration isolation pins and the first straight advance grooves formed on said first cylinder are fitted together is set greater than a force with which the plurality of straight advance pins and the second straight advance grooves are fitted together.

8. An image pickup apparatus comprising:

a lens barrel; and an image pickup device, wherein said lens barrel comprises a cam cylinder, a first cylinder that is located on an outer periphery of the cam cylinder and configured to be engaged in the cam cylinder and caused to move in a direction of an optical axis by rotation of the cam cylinder a second cylinder that is located on an inner periphery of the cam cylinder and is configured to support a lens holding member, which moves in a direction different from the direction of the optical axis so as to correct for an image blur, and is engaged in the cam cylinder and caused to trove in the direction of the optical axis by rotation of the cam cylinder and a fixed cylinder configured to guide said second cylinder movably in the direction of the optical axis while inhibiting rotation of said second cylinder, wherein the second cylinder comprising a plurality of first vibration isolation pins formed on an outer periphery of said second cylinder and a plurality of straight advance pins formed on the outer periphery of said second cylinder, wherein each of the first vibration isolation pins is engaged with each of first straight advance grooves formed on an inner periphery of the first cylinder movably in the direction of the optical axis, each of the straight advance pins is movably in the direction of the optical axis engaged in each of second straight advance grave grooves formed on said fixed cylinder, the plurality of first vibration isolation pins e arranged in a circumferential direction of said second cylinder, the plurality of straight advance pins are arranged in the circumferential direction of said second cylinder, each of the first vibration isolation pins is in contact with each of the first straight advance grooves in a radial direction of said first cylinder and is not in contact with each of the first straight advance groove moves in a circumferential direction of said first cylinder, each of the straight advance pins is in contact with each of the second straight advance grooves in the circumferential direction of said fixed cylinder, and the straight advance pin is on an image plane side relative to the lens holding, member in the direction of the optical axis, and the first vibration isolation pin is on a subject side relative to the lens holding member in the direction of the optical axis.

* * * * *